United States Patent
Gupta et al.

(10) Patent No.: US 10,921,613 B2
(45) Date of Patent: Feb. 16, 2021

(54) NEAR EYE DISPLAY AND RELATED COMPUTER-IMPLEMENTED SOFTWARE AND FIRMWARE

(71) Applicant: NewSight Reality, Inc., Roanoke, VA (US)

(72) Inventors: Ami Gupta, Roanoke, VA (US); Ronald Blum, Atlanta, GA (US)

(73) Assignee: NewSight Reality, Inc., Jacksonville Beach, FL (US)

( * ) Notice: Subject to any disclaimer, the term of this patent is extended or adjusted under 35 U.S.C. 154(b) by 0 days.

(21) Appl. No.: 16/902,003

(22) Filed: Jun. 15, 2020

(65) Prior Publication Data

US 2020/0310164 A1 Oct. 1, 2020

Related U.S. Application Data

(63) Continuation of application No. 16/600,056, filed on Oct. 11, 2019, now Pat. No. 10,684,494, which is a
(Continued)

(51) Int. Cl.
*G09G 5/00* (2006.01)
*G02C 7/06* (2006.01)
(Continued)

(52) U.S. Cl.
CPC ............ *G02C 7/06* (2013.01); *G02B 27/0172* (2013.01); *G06T 19/006* (2013.01); *G02B 2027/014* (2013.01); *G02B 2027/0178* (2013.01)

(58) Field of Classification Search
CPC .................................................. G06T 19/006
See application file for complete search history.

(56) References Cited

U.S. PATENT DOCUMENTS 6,376,819 B1 * 4/2002 Neal .......................... G01J 9/00
250/201.9
9,841,537 B2 12/2017 Luebke et al.
(Continued)

FOREIGN PATENT DOCUMENTS

TW    I689751 B    2/2019

OTHER PUBLICATIONS

Related unpublished, co-pending U.S. application for Applicant NewSight Reality, Inc., U.S. Appl. No. 16/855,964, filed Apr. 22, 2020; First Named Inventor Ronald Blum.
(Continued)

*Primary Examiner* — Charles Tseng
(74) *Attorney, Agent, or Firm* — Woods Rogers PLC; Nathan A. Evans

(57) ABSTRACT

A near-eye display for operation of an augmented or mixed reality system that integrates the virtual image generated by the near eye display to the real environment taking account of the visual processes of the retina, the visual cortex and the oculomotor system. The near eye display is provided in the form of a transparent optical module attached to and aligned with a pair of eyeglasses providing the refractive correction required by the wearer. The effect of the light field created by the eyeglass optic and the transparent optical module are used as inputs to the software or firmware program that drive the micro-display in the transparent optical module and control the location of the content as well as the fixation point being displayed on the micro-display. The near eye display acts as the master and the wearer's or user's eyes as the slave. Thus, the light emitters of the near eye display cause the eye(s) of the user to move and be positioned.

36 Claims, 7 Drawing Sheets

The accommodation triad

C. D. Balaban, A. Kiderman, M. Szczupak, R. C. Ashmore and M. E. Hoffer, "Patterns of pupillary activity during binocular disparity resolution", in Frontiers of Neurology Vol 9, Article 990 (Nov 2018).

Related U.S. Application Data continuation-in-part of application No. 16/449,395, filed on Jun. 22, 2019, now Pat. No. 10,634,921, which is a continuation-in-part of application No. 16/289,623, filed on Feb. 28, 2019, now Pat. No. 10,634,912, which is a continuation-in-part of application No. 16/008,707, filed on Jun. 14, 2018, now Pat. No. 10,466,487, which is a continuation-in-part of application No. 15/994,595, filed on May 31, 2018, application No. 16/902,003, filed on Jun. 15, 2020, which is a continuation of application No. 16/571,248, filed on Sep. 16, 2019, and a continuation of application No. 16/855,964, filed on Apr. 22, 2020, and a continuation of application No. 16/859,092, filed on Apr. 27, 2020, and a continuation of application No. 16/868,504, filed on May 6, 2020.

(60) Provisional application No. 62/626,660, filed on Feb. 5, 2018, provisional application No. 62/624,201, filed on Jan. 31, 2018, provisional application No. 62/619,752, filed on Jan. 20, 2018, provisional application No. 62/613,313, filed on Jan. 3, 2018, provisional application No. 62/607,582, filed on Dec. 19, 2017, provisional application No. 62/542,168, filed on Aug. 7, 2017, provisional application No. 62/530,638, filed on Jul. 10, 2017, provisional application No. 62/522,866, filed on Jun. 21, 2017, provisional application No. 62/513,828, filed on Jun. 1, 2017, provisional application No. 62/546,473, filed on Aug. 16, 2017, provisional application No. 62/648,371, filed on Mar. 26, 2018, provisional application No. 62/638,789, filed on Mar. 5, 2018, provisional application No. 62/694,222, filed on Jul. 5, 2018, provisional application No. 62/700,621, filed on Jul. 19, 2018, provisional application No. 62/700,632, filed on Jul. 19, 2018, provisional application No. 62/703,909, filed on Jul. 27, 2018, provisional application No. 62/703,911, filed on Jul. 27, 2018, provisional application No. 62/711,669, filed on Jul. 30, 2018, provisional application No. 62/717,424, filed on Aug. 10, 2018, provisional application No. 62/720,113, filed on Aug. 20, 2018, provisional application No. 62/720,116, filed on Aug. 21, 2018, provisional application No. 62/728,251, filed on Sep. 7, 2018, provisional application No. 62/732,039, filed on Sep. 17, 2018, provisional application No. 62/732,138, filed on Sep. 17, 2018, provisional application No. 62/739,904, filed on Oct. 2, 2018, provisional application No. 62/739,907, filed on Oct. 2, 2018, provisional application No. 62/752,739, filed on Oct. 30, 2018, provisional application No. 62/753,583, filed on Oct. 31, 2018, provisional application No. 62/754,929, filed on Nov. 2, 2018, provisional application No. 62/755,626, filed on Nov. 5, 2018, provisional application No. 62/755,630, filed on Nov. 5, 2018, provisional application No. 62/756,528, filed on Nov. 6, 2018, provisional application No. 62/756,542, filed on Nov. 6, 2018, provisional application No. 62/769,883, filed on Nov. 20, 2018, provisional application No. 62/770,210, filed on Nov. 21, 2018, provisional application No. 62/771,204, filed on Nov. 26, 2018, provisional application No. 62/774,362, filed on Dec. 3, 2018, provisional application No. 62/775,945, filed on Dec. 6, 2018, provisional application No. 62/778,960, filed on Dec. 13, 2018, provisional application No. 62/778,972, filed on Dec. 13, 2018, provisional application No. 62/780,391, filed on Dec. 17, 2018, provisional application No. 62/780,396, filed on Dec. 17, 2018, provisional application No. 62/783,596, filed on Dec. 21, 2018, provisional application No. 62/783,603, filed on Dec. 21, 2018, provisional application No. 62/785,284, filed on Dec. 27, 2018, provisional application No. 62/787,834, filed on Jan. 3, 2019, provisional application No. 62/788,275, filed on Jan. 4, 2019, provisional application No. 62/788,993, filed on Jan. 7, 2019, provisional application No. 62/788,995, filed on Jan. 7, 2019, provisional application No. 62/790,514, filed on Jan. 10, 2019, provisional application No. 62/790,516, filed on Jan. 10, 2019, provisional application No. 62/793,166, filed on Jan. 16, 2019, provisional application No. 62/794,779, filed on Jan. 21, 2019, provisional application No. 62/796,388, filed on Jan. 24, 2019, provisional application No. 62/796,410, filed on Jan. 24, 2019, provisional application No. 62/830,645, filed on Apr. 8, 2019, provisional application No. 62/847,427, filed on May 14, 2019, provisional application No. 62/971,432, filed on Feb. 7, 2020.

(51) Int. Cl.
*G06T 19/00* (2011.01)
*G02B 27/01* (2006.01)

(56) References Cited

U.S. PATENT DOCUMENTS

| | | | |
|---|---|---|---|
| 10,162,182 B2* | 12/2018 | Jepsen | G02B 3/0056 |
| 10,466,487 B2 | 11/2019 | Blum et al. | |
| 10,634,912 B2 | 4/2020 | Blum et al. | |
| 10,634,921 B2 | 4/2020 | Blum et al. | |
| 10,659,757 B2 | 5/2020 | Motta et al. | |
| 10,684,494 B2 | 6/2020 | Blum et al. | |
| 2004/0073921 A1* | 4/2004 | Neely | G06F 16/54 |
| | | | 725/45 |
| 2004/0207807 A1* | 10/2004 | Lindacher | G02C 7/043 |
| | | | 351/159.09 |
| 2006/0082768 A1* | 4/2006 | Wilson | G01J 3/4406 |
| | | | 356/317 |
| 2007/0076208 A1* | 4/2007 | Koo | G01N 21/65 |
| | | | 356/451 |
| 2007/0153231 A1* | 7/2007 | Iuliano | G02C 7/041 |
| | | | 351/159.34 |
| 2007/0215793 A1* | 9/2007 | Gruhlke | G06F 3/0421 |
| | | | 250/221 |
| 2010/0331912 A1* | 12/2010 | Tass | A61N 5/0618 |
| | | | 607/54 |
| 2013/0099091 A1* | 4/2013 | Nemirovsky | H01L 31/024 |
| | | | 250/206 |
| 2014/0062865 A1* | 3/2014 | Fateh | G06F 3/017 |
| | | | 345/156 |
| 2014/0168034 A1* | 6/2014 | Luebke | H04N 13/339 |
| | | | 345/8 |
| 2014/0267420 A1* | 9/2014 | Schowengerdt | G02B 27/0172 |
| | | | 345/633 |
| 2014/0267723 A1* | 9/2014 | Davidson, Jr. | G06T 11/60 |
| | | | 348/147 |
| 2014/0276686 A1* | 9/2014 | Wu | A61B 18/203 |
| | | | 606/9 |
| 2014/0375949 A1* | 12/2014 | Buehren | G02C 7/041 |
| | | | 351/159.05 |
| 2015/0205132 A1* | 7/2015 | Osterhout | G02B 27/0093 |
| | | | 345/633 |
| 2015/0235445 A1* | 8/2015 | Schowengerdt | G02B 27/0172 |
| | | | 345/611 |

(56) References Cited

U.S. PATENT DOCUMENTS

| | | | |
|---|---|---|---|
| 2015/0268415 A1* | 9/2015 | Schowengerdt | G02B 26/08 385/4 |
| 2015/0281680 A1* | 10/2015 | Grafenberg | H04N 13/156 348/50 |
| 2015/0357315 A1* | 12/2015 | Oraw | G09G 3/32 315/294 |
| 2016/0242670 A1* | 8/2016 | Suzuki | A61B 5/04012 |
| 2016/0327798 A1* | 11/2016 | Xiao | G06T 19/006 |
| 2016/0337625 A1* | 11/2016 | Nakamura | G02B 27/1053 |
| 2017/0038590 A1* | 2/2017 | Jepsen | G09G 3/3426 |
| 2017/0039960 A1* | 2/2017 | Jepsen | G02B 3/0062 |
| 2017/0122725 A1* | 5/2017 | Yeoh | H04N 13/344 |
| 2017/0140701 A1* | 5/2017 | Ogonowsky | H01L 31/024 250/206 |
| 2017/0276963 A1* | 9/2017 | Brennan | G02C 7/081 |
| 2017/0293356 A1* | 10/2017 | Khaderi | G06F 3/147 |
| 2018/0130226 A1* | 5/2018 | Meess | G02B 27/0172 |
| 2018/0300951 A1* | 10/2018 | Surti | G06F 3/012 |
| 2018/0348529 A1 | 12/2018 | Blum et al. | |
| 2019/0057957 A1* | 2/2019 | Xie | H04N 13/307 |
| 2019/0094803 A1* | 3/2019 | Futterer | G02B 27/0944 |
| 2020/0012110 A1 | 1/2020 | Blum et al. | |
| 2020/0257122 A1 | 8/2020 | Blum et al. | |
| 2020/0264451 A1 | 8/2020 | Blum et al. | |

OTHER PUBLICATIONS

PCT Application Search Report for PCT/US19/020168; dated May 23, 2019.

PCT Application Search Report for PCT/US18/35424; dated Aug. 31, 2018.

PCT Application Search Report for PCT/US18/37561; dated Sep. 21, 2018.

PCT Application Search Report for PCT/US19/038624; dated Dec. 3, 2019.

PCT Application Search Report for PCT/US19/55735; dated Feb. 6, 2020.

Related co-pending TW application for applicant NewSight Reality, Inc., Application No. 108123133 filed Jul. 1, 2019.

Related co-pending TW application for applicant NewSight Reality, Inc., Application No. 108107329 filed Mar. 5, 2019.

* cited by examiner

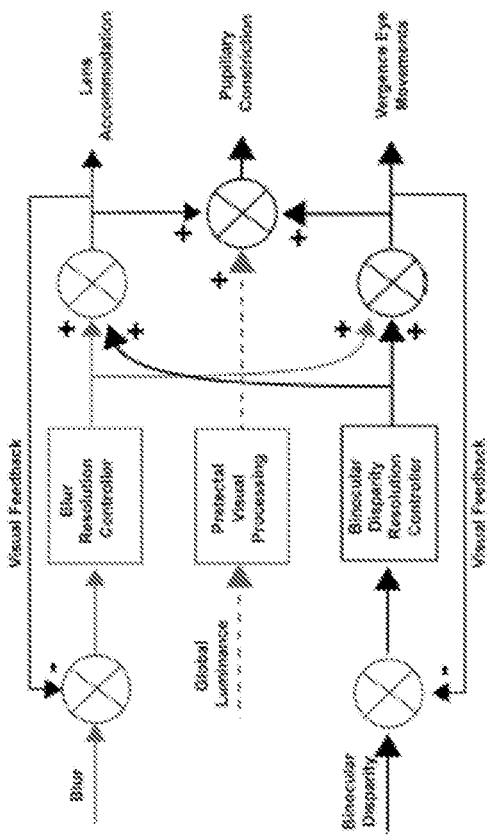
Figure 1. The accommodation triad
C. D. Balaban, A. Kiderman, M. Szczupak, R. C. Ashmore and M. E. Hoffer, "Patterns of pupillary activity during binocular disparity resolution", in Frontiers of Neurology Vol 9, Article 990 (Nov 2018).

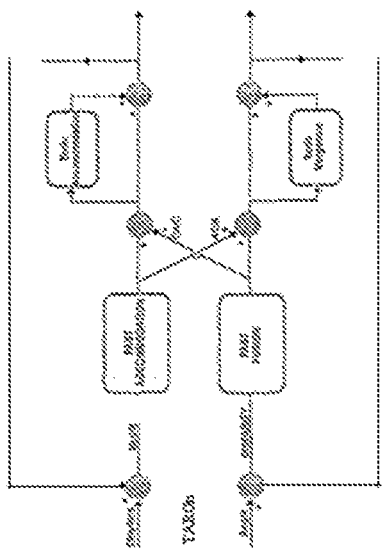

Figure 2. State diagram showing the coupling of vergence and accommodation during fixation. Accommodation is driven by image blur, while vergence is driven by binocular disparity.

Coupled network of accommodation and vergence, in "Oculomotor Functions & Neurology CD-ROM; The material presented in this CD-ROM is intended primarily for Optometry (O.D.) students enrolled in an Ocular Motility/ Oculomotor Neurology course. Text presented in this CD-ROM has been almost exclusively adapted from course notes written by Prof. Clifton M. Schor, O.D., Ph.D., University of California at Berkeley School of Optometry. Copyright: Indiana School of Optometry, 2004".

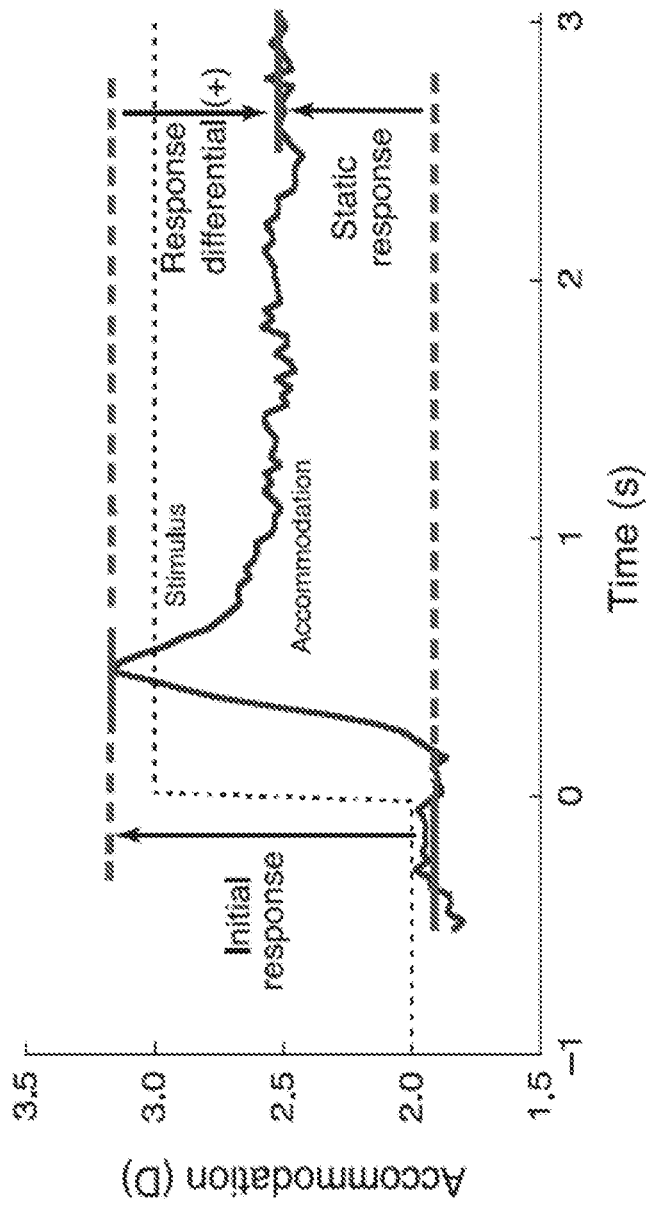
Figure 3. Relative speed of accommodative response to changes in defocus induced blur.
Fukushima, T. et al, "The relationship between CA/C ratio and individual differences in dynamic accommodative responses while viewing stereoscopic images" in *Journal of Vision* {2009) 9(13):21, 1-13)

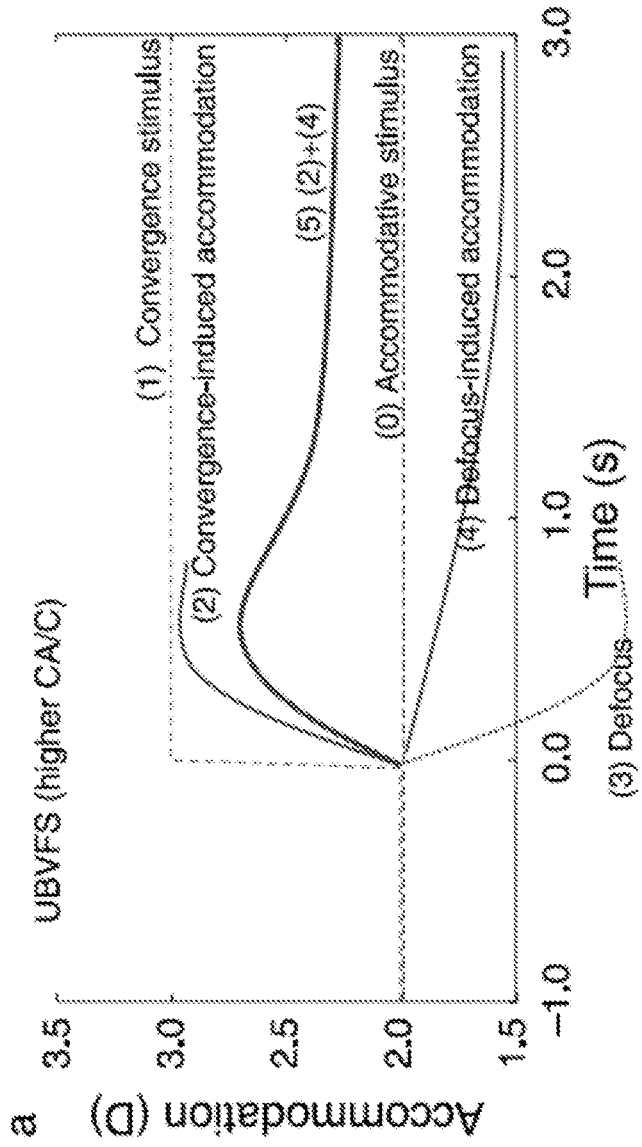
Figure 4. Schematic description of accommodative response to simultaneous presentation of vergence and blur stimuli (UBVFS is unbalanced vergence and focus stimuli)
Fukushima, T. et al, "The relationship between CA/C ratio and individual differences in dynamic accommodative responses while viewing stereoscopic images" in *Journal of Vision* {2009) 9(13):21, 1-13)

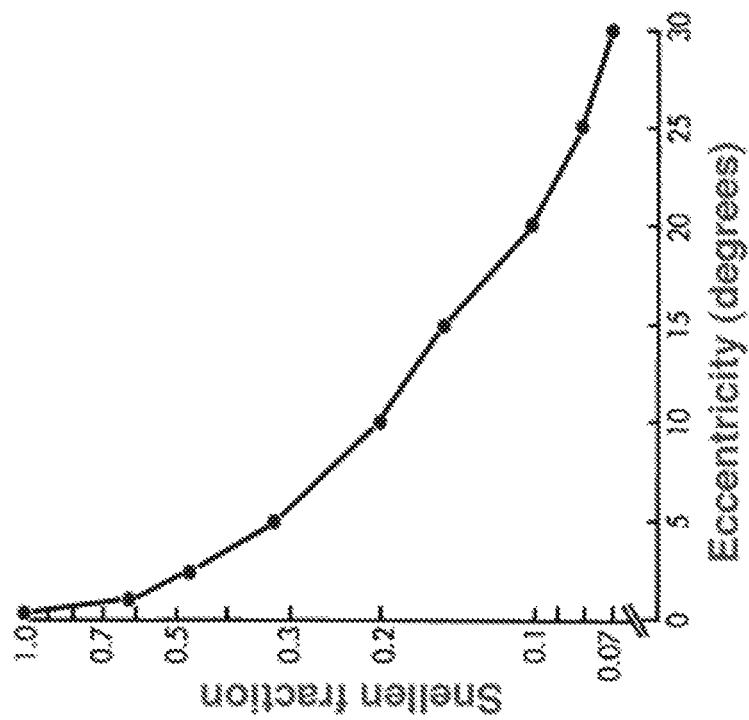
Figure 5. Visual acuity as a function of field of view or retinal eccentricity

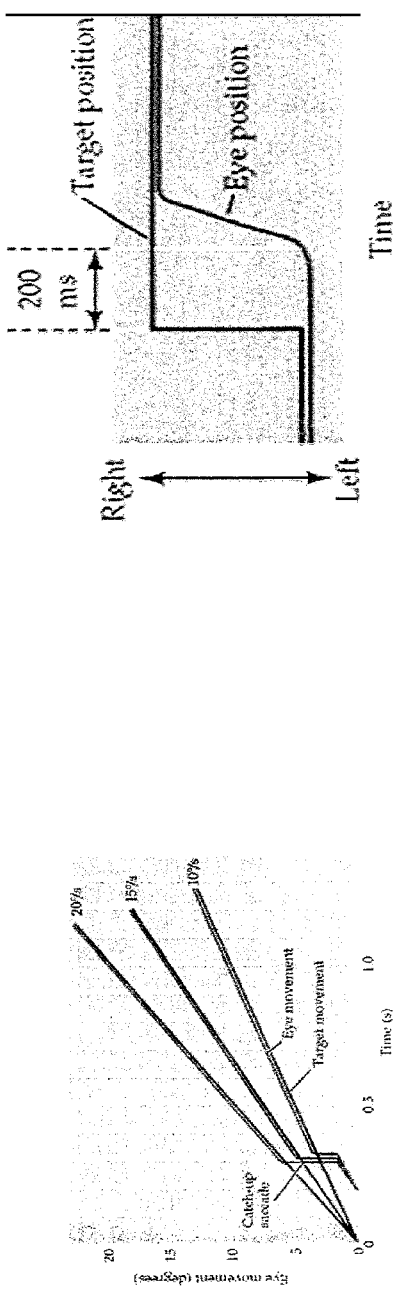
Figure 6. The speed of saccadic and pursuit movements upon application of a vergence load
Versino, M, et al, "Disorders of binocular control of eye movements in patients with cerebellar dysfunction", in *Brain*, 119, pp. 1933-1950; 1996).

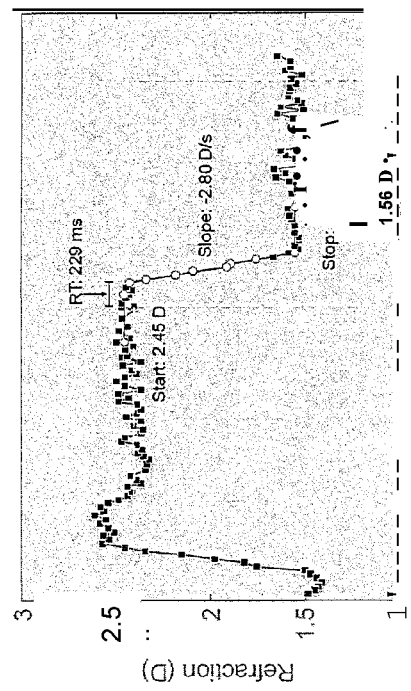
Figure 7. Accommodation response time upon application of a moderate defocus load
Richer, H.O., et al., "Accommodation-vergence performance after low levels of oculomotor load'" in SJWEH Scandinavian Journal of Work, Environment and Health) Supplements 2007; 3, pp 60-67

NEAR EYE DISPLAY AND RELATED COMPUTER-IMPLEMENTED SOFTWARE AND FIRMWARE

CROSS-REFERENCE TO RELATED APPLICATIONS

The present application is a continuation of and relies on the disclosures of and claims priority to and the benefit of the filing date of U.S. patent application Ser. No. 16/600,056 filed Oct. 11, 2019, which claims priority to U.S. patent application Ser. No. 16/449,395 filed Jun. 22, 2019, which claims priority to U.S. patent application Ser. No. 16/289,623 filed Feb. 28, 2019, which claims priority to U.S. patent application Ser. No. 16/008,707 filed Jun. 14, 2018, which claims priority to U.S. application Ser. No. 15/994,595 filed May 31, 2018, as well as the following U.S. Provisional Patent Applications, with filing date and title, all the disclosures of which are hereby incorporated by reference herein in their entireties.

62/971,432 filed Feb. 7, 2020: Development of Retinal Image Quality Requirements for a Near Eye See-Through Augmented Reality Display The present application also relies on the disclosures of and claims priority to and the benefit of the filing dates of U.S. patent application Ser. No. 16/571,248 filed Sep. 16, 2019, Ser. No. 16/855,964 filed Apr. 22, 2020, Ser. No. 16/859,092 filed Apr. 27, 2020, and Ser. No. 16/868,504 filed May 6, 2020.

Again, the disclosures of each of the-above referenced applications are incorporated by reference herein in their entireties.

BACKGROUND

Field of the Invention

The present invention is directed to operation of a near eye augmented or mixed reality system that integrates the virtual image generated by the near eye display to the real environment taking account of the visual processes of the retina, the visual cortex and the oculomotor system.

Description of Related Art

Today's augmented and/or mixed reality systems in most cases have a large form factor and are clunky, heavy, power hungry and expensive. For these systems to have an increased level of adoption a major transformational technology change or innovation is needed. In addition, it is important that any such innovation can be easily adapted to current established eyewear and ophthalmic lens manufacturing and distribution. The innovation disclosed herein teaches such a transformational breakthrough for the AR (augmented reality) & MR (mixed reality) industries.

SUMMARY OF THE INVENTION

This invention discloses operation of a near eye augmented or mixed reality system that integrates the virtual image generated by the near eye display to the real environment taking account of the visual processes of the retina, the visual cortex and the oculomotor system. The near eye display disclosed here is provided in the form of a transparent optical module attached to and aligned with a pair of eyeglasses providing the refractive correction required by the wearer. The effect of the light field created by the eyeglass optic and the transparent optical module are used as inputs to the software or firmware program that drive the micro-display in the transparent optical module and control the location of the content as well as the fixation point being displayed on the micro-display. In embodiments, the near eye display is transparent and utilizes light emitters that are aligned, and distance separated from micro-lenses (or lenslets) of a micro-lens array (or lenslet array). With the invention disclosed herein the near eye display acts as the master and the wearer's or user's eyes as the slave. Thus, the light emitters of the near eye display cause the eye(s) of the user to move and be positioned.

BRIEF DESCRIPTION OF THE DRAWINGS

The accompanying drawings illustrate certain aspects of some of the embodiments of the present invention, and should not be used to limit or define the invention. Together with the written description the drawings serve to explain certain principles of the invention.

FIG. 1 shows the accommodation triad, showing the interrelationship between change of refractive power of the eye in response to perception of a blurry image on the retina (accommodation), the relative orientation of gaze directions of both eyes and their point of intersection, known as vergence and pupillary constriction or dilation.

FIG. 2 shows the interrelationship between vergence and accommodation and distinguishing between tonic vergence and tonic accommodation on the one hand and fast vergence and fast accommodation on the other.

FIG. 3 shows the dynamic of accommodative response to a blurry image, including accommodative overshoot.

FIG. 4 shows the accommodative response to a combined stimulus of vergence and blur, showing that response to changes in vergence is faster than changes in image blur.

FIG. 5 shows visual acuity of resolution (Snellen or equivalent) as a function of retinal eccentricity.

FIG. 6 shows the eye movements that occur when a vergence load is applied or a change in vergence occurs. It demonstrates the role of pursuit movements and saccadic movements in tracking the moving object without any head movement.

FIG. 7 shows the dynamics of accommodative response upon change of object distance causing application of an accommodative stimulus.

DETAILED DESCRIPTION OF VARIOUS EMBODIMENTS

Contextual Display of Virtual Images.

The invented device is, in aspects, designed to be worn with eyeglasses, and it utilizes eyeglasses to control image magnification and focus as a function of gaze direction. It is necessary to avoid mismatches of accommodation with vergence when displaying virtual images that may be still or video. The accommodative process in which the natural lens of the eye changes power to minimize image blur on the retina caused by defocus is linked to eye movement controlling gaze direction and hence vergence as well as pupil diameter in a coupled network, often referred to as the accommodation triad (FIG. 1).

Generally stereoscopic vision occurs when the visual system has disparity information. Disparity information can arise from two viewing positions in a natural scene, or when each eye views a different image. The latter condition can induce uncoupling of normal yoked accommodation and vergence responses as the accommodation response bias will be toward the screen position whereas the convergence response bias will be driven by the disparity specified location in space of the stereoscopic image. The resulting conflict between accommodation and vergence responses has been identified as a potent cause of visual fatigue and eyestrain. This is why a requirement of a binocular embodiment is to present virtual images at display locations in which the coupling between accommodation and vergence is maintained by positioning each virtual image in its proper context (FIG. 2).

The invention disclosed herein is that of a near eye display in optical communication with a vision correcting mechanism, such as eyeglasses (e.g., spectacles or spectacle lenses), wherein the software and/or firmware is programed to project content and a fixation point on said display, wherein when being used monocularly one fixation point is used, wherein when being used binocularly there are two fixations points with one located on each display, wherein said fixation point may form a part of said content or may be separated from it, wherein said fixation point being of brightness that is, in aspects, 2× or more than said content. In other aspects, the near eye display may be in optical communication with spectacle lenses, a micro-lens array, or both. The fixation point(s) can be separated from said content by a field of view of, in embodiments, no more than about 20 degrees. The fixation point(s) can be the locus of a zone in said display that achieves an image resolution of, in embodiments, no less than 60-line pairs per mm over a field of view of 0-5 degrees from said fixation point. The content can form a virtual image that has an optical resolution of, in embodiments, no less than 10 lp/mm over an annular zone defined by an inner field of view of 5 degrees and an outer field of view of 20 degrees. The fixation point(s) can be located such that they are misaligned by a field of view in the range 0.1 degrees to 1.5 degrees, or in some cases lower than 0.1 degrees and in cases over 1.5 degrees. The near eye display can be a binocular display. The near eye display can be a monocular display. The near eye display can be, by way of example only, see-through, transparent, or semi-transparent. The near eye display can be driven by software or firmware that controls the size and resolution of the displayed content based on the location of the virtual image relative to the one or both eyes of the wearer. The near eye display can comprise videos that are displayed at a speed that are computed by said software or firmware from the speed of pursuit eye movements, and are in the range of 1-20 HZ, by way of example. A near eye display can be in optical communication with an eyeglass optic wherein said eyeglass optic comprises optical power that varies across said optic, increasing as a function of the degree of downward gaze of said wearer. The virtual image can have a brightness of said image that varies across the image and includes a zone of about 10-100 microns in diameter of maximum brightness. The level of brightness and size of the brightness area can be controlled by the software and/or firmware. A zone on said display can be illuminated so that it functions as a fixation point and is separate from said content that is displayed. The eyeglass optic that is in optical communication with the near eye display can have an optical power that comprises a prismatic component that is designed to achieve binocular summation at a distance intended for viewing a virtual image. The near eye display projects a viewable content at a specified location within said display relative to the optical center of said eyeglass optic, wherein an embedded software or firmware program computes and locates said location based on the distance of the virtual image relative to one or both eyes of the wearer. An extended reality system comprising a see-through near eye display and a micro-lens array, wherein software or firmware comprise a cue that locates the virtual image a long an X, Y, or Z axis, wherein the see-through near eye display comprises a plurality of light emitters, wherein the see-through near eye display is capable of moving a virtual image along an X, Y and/or Z axis as seen or perceived by a user or wearer of the extended reality system by illuminating different light emitters in accordance with said cue which causes an eye or eyes of the user or wearer to change fixation in response to changing illumination of the different light emitters. (Extended Reality herein may also be referred to as "XR," and the system taught herein may be used for XR, augmented reality (AR), virtual reality (VR), mixed reality (MR), combinations thereof, or variations thereof that would be apparent to one of ordinary skill in the art.) The invention disclosed herein includes software or firmware for an XR system, wherein the software or firmware locate the fixation point of an eye or eyes of the wearer, wherein the XR system comprises a see-through near eye display, wherein the see through near eye display comprises a plurality of light emitters, wherein the software or firmware cause the light emitters to generate a virtual image as seen by the eye or eyes of a wearer, wherein the software or firmware create a fixation point by causing one or more of a plurality of light emitters to have a brightness that is 2× or greater than the other light emitters generating the remaining virtual image.

The near eye display can be used with an XR system, wherein said XR system comprises a see-through near eye display and a micro-lens array, wherein said see-through near eye display comprises a plurality of light emitters, wherein the see-through near eye display moves a virtual image along the X, Y and/or Z axis as seen by a user by way of illuminating different light emitters which cause a different eye fixation of the user.

Embodiments of the Invention

An embodiment consists of a near eye display in optical communication with an eyeglass optic, wherein said near eye display projects a viewable content at a specified location within said display relative to the optical center of said eyeglass optic, wherein an embedded software or firmware program computes said location based on the distance of the virtual image relative to the eyes of the wearer, using vergence to compute the putative location of the virtual image. The near eye display is in aspects a binocular display. In aspects, the near eye display is a see-through binocular near eye display, meaning that one near eye display is positioned in front of each eye. The near eye display utilizes software or firmware that controls the size, resolution and brightness of the displayed content based on the location of the virtual image relative to the one or both eyes of the wearer.

In another embodiment, the brightness of the projected content can be adjusted as a whole or in partial elements thereof by software or firmware coded in the microcontroller of the device. In a preferred embodiment, an element (or more than one element) of the projected content is made brighter than the brightness of the rest of the virtual image by a factor of about 2×-20×, preferably about 3× to 10×. This element of the virtual image functions to drive fixation of the fovea through rapid saccadic movements and relatively slower pursuit movements, and also functions as a focus cue for the virtual image, as shown in FIG. 2. The conclusion was that two different types of accommodative mechanisms could be distinguished, a defocus driven accommodative process and a convergence driven accommodative process, with the initial accommodative response being provided by the convergence driven accommodative process, although the dynamics (response time) of the two processes depended on the magnitude of the visual stimulus.

Such contextual positioning of the virtual image in the near eye display in the transparent ocular module generates an oculomotor stimulus that drives the fovea to the desired fixation locus in the virtual image.

In another embodiment, the resolution of the virtual image is varied across the overall projected content, said optical resolution being highest at the focus cue or the brightest element of the projected content. Resolution is reduced as a function of field of view relative to the fixation point according to a plot similar to that shown in FIG. 3. The optical resolution controlled by the area density of activated pixels displaying the content on the micro-display of all parts of the projected content is maintained, sometimes always maintained, at a level closest to the visual acuity (e.g., Snellen acuity or equivalent that measures ability of the eye to resolve fine details) of the eye at the corresponding field of view or retinal eccentricity. This has the benefit of consuming less energy by the micro-display and is sometimes referred to as a foveated display. In cases, the zone immediately surrounding the fixation point should produce a retinal image of highest optical resolution, preferably no less than 50 lp/mm, in aspects, while the optical resolution of the rest of the projected content may be less, and in cases substantially less. For example, the optical resolution can be as low as 10 lp/mm over a zone of inner eccentricity of 5 degrees and outer eccentricity of 20 degrees.

In embodiments, the near eye display displays videos at a speed that are computed by said software or firmware from the speed of pursuit eye movements and are in the range of 5-20 HZ, by way of example.

Another embodiment is that of a near eye display in optical communication with an eyeglass optic, wherein said eyeglass optic comprises optical power that varies across said optic, increasing as a function of the degree of downward gaze of said wearer.

Still another embodiment is that of an eyeglass optic having optical power that comprises a prismatic component that is designed to achieve binocular summation at a distance intended for viewing a virtual image.

Another embodiment is an XR system, wherein said XR system comprises a see-through near eye display and a micro-lens array, wherein said see-through near eye display comprises a plurality of light emitters, wherein the see-through near eye display moves a virtual image along the X, Y and/or Z axis as seen by a user by way of illuminating different light emitters which cause a different eye fixation of the user. The XR system can provide augmented reality or mixed reality to a user.

Software is used by the XR system to locate the virtual image within the transparent optical module (TOM) so that the virtual image is placed in proper context. A map of focal length and magnification is created as a function of gaze direction by the eyeglass optic of the wearer and used to compute the optimum x, y location of the pixel or pixel patches creating some or every virtual image to be displayed on the TOM. This location on the eyeglass optic takes into account the zoom angle, and hence the vergence and focal length of the virtual image seen through that point on the eyeglass optic, and hence the image magnification of the virtual image located at that point on the display. The control software projects the virtual image at that location on the display component of the TOM. In another embodiment, image transparency is adjusted to provide additional cues of depth. In a particular binocular embodiment, it is necessary to separately compute the location of the virtual image on the right and left eye displays, in order to create controlled amounts of parallax error (relative misalignment of the right and left eye images both located within the Panum's fusion zone) that adds to depth perception. This approach drives gaze direction by the location of activated pixels on the display rather than driving the display by monitoring gaze direction, monitored by a gaze tracker. In embodiments, the illuminated pixels in the display of the TOM drive fixation.

In some embodiments, the virtual image itself or a feature thereof functions as a fixation point for each eye. In other embodiments, a separate fixation stimulus may be provided in order to direct gaze direction and hence control the vergence requirement. A fixation point may comprise a group of illuminated pixels on the display and may form an illuminated spot in the size range 10-100 microns, by way of example. A fixation point away from the location of the virtual image may be provided if it is desired to display a virtual image to be viewed eccentrically. So, if a virtual image needs to be positioned nasal to the primary gaze direction, a fixation point may be provided along the primary gaze direction, and the virtual image at a desired x, y location, nasal to the fixation point. Providing a fixation point away from the displayed content also allows the virtual image to be positioned at the desired real environment. For example, if the fixation point is selected to be the most prominent feature of the virtual content, the rest of the projected content may be viewed peripherally. In another embodiment, the fixation point is projected binocularly, but the rest of the projected content is provided monocularly, in order to suppress involuntary head movements to view an eccentrically located virtual content. When a fixation point is located eccentrically with respect to the displayed content, the angular separation of the fixation point from the center of the displayed content should preferably not be more than 20 degrees of arc, and more preferably no more than 10 degrees of arc.

In embodiments that project a fixation point separate from the content forming the virtual image, the fixation point is preferably brighter than the projected content by a factor of 2× to 20×, preferably 3× to 10×, in aspects. In some embodiments, a separate fixation point can vary in location with time in order to be correctly aligned with a projected video that forms a virtual image that can be programmed ahead of time, or be selected in near-real-time or in real-time by maintaining a constant distance and orientation relative to the center of gravity of the display that generates the virtual image. This approach of providing a fixation point to control gaze direction as well as the virtual image at a calculated eccentricity with respect to the location of the fixation point can be provided either monocularly or binocularly.

In another embodiment, the brightness of the fixation point is preferably higher than the displayed content forming the virtual image, enabling it to function as a focus cue. Preferably, the fixation locus is provided binocularly, ensuring that the vergence of the fixation point is consistent with the refractive power of the optic at the fixation points.

By way of example only, the virtual image will be projected at a precise location within the display (TOM), based on the context. For example, a virtual image projected at x=+1 degree, y=2 degrees (left eye) and x=−1 degree, y=1 degree (right eye), will appear to be far away, since rays coming from the display will converge at a distance more than 20 feet from the eyes. The virtual image will be seen through a part of eyeglass optic that is designed to provide distance correction, therefore, sharing the same focus and magnification as far objects. So, if the wearer looks at an orange tree in winter, for example, and wishes to visualize what it will look like in summer, a virtual image of an orange can be made to appear hanging from the tree by locating the virtual image of the orange at the same point of convergence as the tree. In cases, the relative location of the optical center of the eyeglass optic (x−0, y=0) from the origin, x=0, y=0 of the display (TOM) will be used as a registration vector and will be used by the software to locate the virtual image with respect of the user's center of pupil. Since the display emits light, it will also serve as a fixation point, forcing the eyes to align their gaze directions to the center of the virtual image display.

In embodiments, optical transparency of TOM will be better than 70%, preferably better than 90%. Placement of the micro-display (TOM) can be made with respect to the eyeglass optic in multiple different configurations. These placement configurations depend on use case for each. For example, in one configuration, the lower edge of the TOM is placed about 5 mm above the optical center of the eyeglass, also the point at which primary gaze direction (i.e., the direction of gaze when the wearer is looking straight ahead) intersects the eyeglass optic. This configuration is useful for wearers who need to have completely undisturbed far vision. In a second configuration, TOM is placed across the whole eyeglass optic, covering as an example only, a range of coordinates of +10.0 mm<x<−10 mm and +5 mm<y<−10 mm, when x=0, y=0, represents the optical center of the eyeglass optic. In this placement configuration, the virtual image can be placed foveally at primary gaze or anywhere within the macula with an eccentricity of +/−8 degrees or less in the nasal-temporal direction, and +/−8 degrees or less in the inferior-superior direction. The eyebox size is sufficient to accommodate a range of +/−6 mm of IPD, in other words more than 90% of all persons and all styles of eyewear, in examples. This will allow the virtual image to be placed in the near and intermediate field as a function of downgaze angle ranging from 0 degrees (no downgaze) to 25 degrees downgaze, in aspects.

Commonly, wearers use a downgaze of 15-30 degrees to read, and a downgaze of 10+/−2 degrees to work on the computer screen. A downgaze of 3-10 degrees is commonly used to view intermediate objects at a distance of 6-15 feet. In this configuration, TOM is curved along the x axis, matching the curvature of the eyeglass optic. The estimates above assume a natural pupil size of 4 mm or less.

In a third configuration, TOM is integrated with the eyeglass optic, since, in aspects, it will have the same curvature of the outer surface of the eyeglass optic (called the base curve).

In configurations, the origin (central reference point used to provide the coordinates of each pixel and lenslet) of TOM is specified in order to compute a vector p (x,y) that defines the location of the origin of TOM relative to the optical center of the eyeglass optic, presumed to be aligned to the primary gaze angle of the wearer and located at the point of intersection of the primary gaze direction with the surface of the eyeglass optic. The registration that will be needed is the location of the center of the display (x=0, y=0) with reference to the optical center of the eyeglass lens. The software algorithm will have a lookup table that will include this information. No registration will be required, because unlike real world images, the virtual image will drive gaze direction and eye movement, not vice versa.

Relationship Between Fixation Process and Display Refresh Rate—

The average response time of the accommodative process varies from 250 msec to over 1 second, in aspects. The speed of a saccadic eye movement is shown in FIG. 5. When the target moves suddenly to the right, there is a delay of about 200 msec before the eye begins to move to the new target position. The eye catches up to the target by executing a rapid saccadic movement, then follows the target through a pursuit movement, as shown for example in FIG. 5. FIG. 6 shows a typical accommodative response curve upon application of a moderate defocus load. Accommodative response time for relatively low levels of accommodative defocus load is generally slower than the eye movement triggered by a vergence load and is approximately 300 (+/−50) msec, depending on the brightness of the stimulus and the magnitude of the defocus load. Visual acuity (resolution and detection) also depends on the speed of the movement of the projected content on the micro-display and should be less than about 150 degrees per second, in aspects, and preferably about 100 degrees per second. In an embodiment, the virtual image is moved across the micro-display at a speed of no more than 100 degrees per second, or about 50 mm per second at the plane of the transparent optical module (TOM). The maximum speed depends on the contents being displayed and the resolution being required to perceive the resulting virtual image.

Embodiments of the invention also include a computer readable medium comprising one or more computer files comprising a set of computer-executable instructions for performing one or more of the calculations, steps, processes and operations described and/or depicted herein. In exemplary embodiments, the files may be stored contiguously or non-contiguously on the computer-readable medium. Embodiments may include a computer program product comprising the computer files, either in the form of the computer-readable medium comprising the computer files and, optionally, made available to a consumer through packaging, or alternatively made available to a consumer through electronic distribution. As used in the context of this specification, a "computer-readable medium" is a non-transitory computer-readable medium and includes any kind of computer memory such as floppy disks, conventional hard disks, CD-ROM, Flash ROM, non-volatile ROM, electrically erasable programmable read-only memory (EEPROM), and RAM. In exemplary embodiments, the computer readable medium has a set of instructions stored thereon which, when executed by a processor, cause the processor to perform tasks, based on data stored in the electronic database or memory described herein. The processor may implement this process through any of the procedures discussed in this disclosure or through any equivalent procedure.

In other embodiments of the invention, files comprising the set of computer-executable instructions may be stored in computer-readable memory on a single computer or distributed across multiple computers. A skilled artisan will further appreciate, in light of this disclosure, how the invention can be implemented, in addition to software, using hardware or firmware. As such, as used herein, the operations of the invention can be implemented in a system comprising a combination of software, hardware, or firmware.

Embodiments of this disclosure include one or more computers or devices loaded with a set of the computer-executable instructions described herein. The computers or devices may be a general purpose computer, a special-purpose computer, or other programmable data processing apparatus to produce a particular machine, such that the one or more computers or devices are instructed and configured to carry out the calculations, processes, steps, operations, algorithms, statistical methods, formulas, or computational routines of this disclosure. The computer or device performing the specified calculations, processes, steps, operations, algorithms, statistical methods, formulas, or computational routines of this disclosure may comprise at least one processing element such as a central processing unit (i.e., processor) and a form of computer-readable memory which may include random-access memory (RAM) or read-only memory (ROM). The computer-executable instructions can be embedded in computer hardware or stored in the computer-readable memory such that the computer or device may be directed to perform one or more of the calculations, steps, processes and operations depicted and/or described herein.

Additional embodiments of this disclosure comprise a computer system for carrying out the computer-implemented method of this disclosure. The computer system may comprise a processor for executing the computer-executable instructions, one or more electronic databases containing the data or information described herein, an input/output interface or user interface, and a set of instructions (e.g., software or firmware) for carrying out the method or system. The computer system can include a stand-alone computer, such as a desktop computer, a portable computer, such as a tablet, laptop, PDA, or smartphone, or a set of computers connected through a network including a client-server configuration and one or more database servers. The network may use any suitable network protocol, including IP, UDP, or ICMP, and may be any suitable wired or wireless network including any local area network, wide area network, Internet network, telecommunications network, Wi-Fi enabled network, or Bluetooth enabled network. In one embodiment, the computer system comprises a central computer connected to the internet that has the computer-executable instructions stored in memory that is operably connected to an internal electronic database. The central computer may perform the computer-implemented method based on input and commands received from remote computers through the internet. The central computer may effectively serve as a server and the remote computers may serve as client computers such that the server-client relationship is established, and the client computers issue queries or receive output from the server over a network. By way of example only, the system described herein, including the near eye display, may receive instructions or other communications from a connected electronic device, such as a smartphone. The system may receive instructions through a network, such as a 4G or 5G network, in aspects.

The input/output interfaces may include a graphical user interface (GUI) which may be used in conjunction with the computer-executable code and electronic databases. The graphical user interface may allow a user to perform these tasks through the use of text fields, check boxes, pull-downs, command buttons, and the like. A skilled artisan will appreciate how such graphical features may be implemented for performing the tasks of this disclosure. The user interface may optionally be accessible through a computer connected to the internet. In one embodiment, the user interface is accessible by typing in an internet address through an industry standard web browser and logging into a web page. The user interface may then be operated through a remote computer (client computer) accessing the web page and transmitting queries or receiving output from a server through a network connection.

The present invention has been described with reference to particular embodiments having various features. In light of the disclosure provided above, it will be apparent to those skilled in the art that various modifications and variations can be made in the practice of the present invention without departing from the scope or spirit of the invention. One skilled in the art will recognize that the disclosed features may be used singularly, in any combination, or omitted based on the requirements and specifications of a given application or design. When an embodiment refers to "comprising" certain features, it is to be understood that the embodiments can alternatively "consist of" or "consist essentially of" any one or more of the features. Any of the methods disclosed herein can be used with any of the compositions disclosed herein or with any other compositions. Likewise, any of the disclosed compositions can be used with any of the methods disclosed herein or with any other methods. Other embodiments of the invention will be apparent to those skilled in the art from consideration of the specification and practice of the invention.

It is noted in particular that where a range of values is provided in this specification, each value between the upper and lower limits of that range, to the tenth of the unit disclosed, is also specifically disclosed. Any smaller range within the ranges disclosed or that can be derived from other endpoints disclosed are also specifically disclosed themselves. The upper and lower limits of disclosed ranges may independently be included or excluded in the range as well. The singular forms "a," "an," and "the" include plural referents unless the context clearly dictates otherwise. It is intended that the specification and examples be considered as exemplary in nature and that variations that do not depart from the essence of the invention fall within the scope of the invention. Further, all of the references cited in this disclosure are each individually incorporated by reference herein in their entireties and as such are intended to provide an efficient way of supplementing the enabling disclosure of this invention as well as provide background detailing the level of ordinary skill in the art.

The invention claimed is:

1. A system for displaying an image comprising:
   one or more near eye displays in optical communication with one or more optics, and
   software and/or firmware,
   wherein the software and/or firmware is programmed to create one or more images and one or more fixation points on the one or more near eye displays, and
   wherein the one or more fixation points are at least two times brighter than the one or more images associated with the one or more fixation points; and
   wherein the one or more fixation points is a locus of a zone in the one or more near eye displays capable of achieving an image resolution of greater than about 60 line pairs per millimeter over a field of view of about 0-5 degrees from the one or more fixation points.

2. The system of claim 1, wherein the one or more fixation points is separated from the one or more images by a field of view of less than about 20 degrees.

3. The system of claim 1, wherein the one or more near eye displays is a binocular display.

4. The system of claim 1, wherein the software and/or firmware controls a size and resolution of the one or more images based on a location of the one or more images relative to one or both eyes of a wearer or user.

5. The system of claim 1, wherein the one or more images comprise a video, and wherein the video is displayed at a speed of the video that is computed by the software and/or firmware from a speed of pursuit eye movements, and wherein the speed of the video is within a range of about 1-20 HZ.

6. The system of claim 1, wherein the one or more optics comprise optical power that varies across the one or more optics, and wherein the optical power increases as a function of a degree of downward gaze of a user or wearer.

7. The system of claim 1, wherein a brightness of the one or more images varies across the one or more images, and wherein a zone of increased brightness is about 10-100 microns in diameter.

8. The system of claim 1, wherein the one or more fixation points is illuminated at a zone of the one or more near eye displays that is separate from the one or more images.

9. The system of claim 1, wherein the one or more optics has an optical power that comprises a prismatic component that is capable of providing binocular summation at a distance intended for viewing a virtual image.

10. The system of claim 1, wherein the one or more near eye displays is a see-through near eye display.

11. The system of claim 1, wherein the one or more optics comprises a spectacle lens.

12. The system of claim 1, wherein the one or more optics comprises a micro-lens array.

13. A system for displaying an image comprising:
one or more near eye displays in optical communication with one or more optics, and
software and/or firmware,
wherein the software and/or firmware is programmed to create one or more images and one or more fixation points on the one or more near eye displays, and
wherein the one or more fixation points are at least two times brighter than the one or more images associated with the one or more fixation points; and
wherein the one or more images is a virtual image having an optical resolution of greater than about 10 line pairs per millimeter over an annular zone defined by an inner field of view of about 5 degrees and an outer field of view of about 20 degrees.

14. The system of claim 13, wherein the one or more fixation points is separated from the one or more images by a field of view of less than about 20 degrees.

15. The system of claim 13, wherein the one or more near eye displays is a binocular display.

16. The system of claim 13, wherein the software and/or firmware controls a size and resolution of the one or more images based on a location of the one or more images relative to one or both eyes of a wearer or user.

17. The system of claim 13, wherein the one or more images comprise a video, and wherein the video is displayed at a speed of the video that is computed by the software and/or firmware from a speed of pursuit eye movements, and wherein the speed of the video is within a range of about 1-20 HZ.

18. The system of claim 13, wherein the one or more optics comprise optical power that varies across the one or more optics, and wherein the optical power increases as a function of a degree of downward gaze of a user or wearer.

19. The system of claim 13, wherein a brightness of the one or more images varies across the one or more images, and wherein a zone of increased brightness is about 10-100 microns in diameter.

20. The system of claim 13, wherein the one or more fixation points is illuminated at a zone of the one or more near eye displays that is separate from the one or more images.

21. The system of claim 13, wherein the one or more optics has an optical power that comprises a prismatic component that is capable of providing binocular summation at a distance intended for viewing a virtual image.

22. The system of claim 13, wherein the one or more near eye displays is a see-through near eye display.

23. The system of claim 13, wherein the one or more optics comprises a spectacle lens.

24. The system of claim 13, wherein the one or more optics comprises a micro-lens array.

25. A system for displaying an image comprising:
one or more near eye displays in optical communication with one or more optics, and
software and/or firmware,
wherein the software and/or firmware is programmed to create one or more images and one or more fixation points on the one or more near eye displays, and
wherein the one or more fixation points are at least two times brighter than the one or more images associated with the one or more fixation points; and
wherein the one or more fixation points is a plurality of fixation points and the plurality of the fixation points are located on the near eye display such that the plurality of fixation points are misaligned by a field of view in a range of about 0.1 degrees to about 1.5 degrees.

26. The system of claim 25, wherein the one or more fixation points is separated from the one or more images by a field of view of less than about 20 degrees.

27. The system of claim 25, wherein the one or more near eye displays is a binocular display.

28. The system of claim 25, wherein the software and/or firmware controls a size and resolution of the one or more images based on a location of the one or more images relative to one or both eyes of a wearer or user.

29. The system of claim 25, wherein the one or more images comprise a video, and wherein the video is displayed at a speed of the video that is computed by the software and/or firmware from a speed of pursuit eye movements, and wherein the speed of the video is within a range of about 1-20 HZ.

30. The system of claim 25, wherein the one or more optics comprise optical power that varies across the one or more optics, and wherein the optical power increases as a function of a degree of downward gaze of a user or wearer.

31. The system of claim 25, wherein a brightness of the one or more images varies across the one or more images, and wherein a zone of increased brightness is about 10-100 microns in diameter.

32. The system of claim 25, wherein the one or more fixation points is illuminated at a zone of the one or more near eye displays that is separate from the one or more images.

33. The system of claim 25, wherein the one or more optics has an optical power that comprises a prismatic component that is capable of providing binocular summation at a distance intended for viewing a virtual image.

34. The system of claim 25, wherein the one or more near eye displays is a see-through near eye display.

35. The system of claim 25, wherein the one or more optics comprises a spectacle lens.

36. The system of claim 25, wherein the one or more optics comprises a micro-lens array.

* * * * *